United States Patent [19]
Derks

[11] Patent Number: 5,990,670
[45] Date of Patent: Nov. 23, 1999

[54] POWER CONVERTOR, AN INTEGRATED, AND A TELECOMMUNICATION DEVICE

[75] Inventor: Henk Derks, Eindhoven, Netherlands

[73] Assignee: U.S. Philips Corporation, New York, N.Y.

[21] Appl. No.: 09/116,402

[22] Filed: Jul. 16, 1998

[30] Foreign Application Priority Data

Jul. 17, 1997 [EP] European Pat. Off. .............. 97202249

[51] Int. Cl.$^6$ .............................. G05F 1/573; G05F 1/40
[52] U.S. Cl. ......................... 323/282; 323/283; 323/277
[58] Field of Search .................................. 323/282, 283, 323/273, 277

[56] References Cited

U.S. PATENT DOCUMENTS

| | | | |
|---|---|---|---|
| 5,627,459 | 5/1997 | Itoyama et al. ......................... | 323/282 |
| 5,670,866 | 9/1997 | Suzuki et al. ............................. | 323/289 |
| 5,675,240 | 10/1997 | Fujisawa et al. ........................ | 323/282 |
| 5,717,322 | 2/1998 | Hawkes et al. .......................... | 323/283 |
| 5,731,694 | 3/1998 | Wilcox et al. ........................... | 323/287 |
| 5,747,976 | 5/1998 | Wong et al. .............................. | 323/282 |
| 5,808,455 | 9/1998 | Schartz et al. ........................... | 323/271 |

*Primary Examiner*—Peter S. Wong
*Assistant Examiner*—Bao Q. Vu

[57] ABSTRACT

A switched mode power convertor with a switch, a switching control device, a coil for storing energy, and a load. The switch is coupled between an input of the power convertor and the coil, and the coil is further coupled to an output of the power convertor. The switching control device has a control input and controls the switch. The switched mode power convertor further has an input current estimator which estimates the input from a quotient of a measured output power and a measured input voltage, taking into account the efficiency of the power convertor. A signal proportional to the estimated input current is supplied to the control input.

12 Claims, 1 Drawing Sheet

POWER CONVERTOR, AN INTEGRATED, AND A TELECOMMUNICATION DEVICE

BACKGROUND OF THE INVENTION

The present invention relates to a power convertor outlined in the preamble of claim 1.

The present invention also relates to an integrated circuit comprising such a power convertor and to a telecommunication device such as a telephone or facsimile provided with such a power convertor.

Such a power convertor also known as switched mode power supply and applied in an IC and telephone is generally known. In particular it is known from EP-A-0 190 110 to implement an output voltage stabilised power convertor in an integrated circuit and to use it in a telecommunication device, such as a telephone, a facsimile, a modem or the like. The known power convertor is provided with a switching control device for interrupting supplied input power. These power convertors have the known ability to convert with a high efficiency the supplied input voltages and currents from one value to another value. Their ability is being used for converting line power on a line such as a telephone line to voltages and currents which can be used for feeding internal features in the integrated circuit, telephone circuit, as well as in the telephone itself.

Nowadays communication devices have additional line power consuming features such as handsfree, listening-in, on hook dialling features, a loudspeaker used as a buzzer etcetera. Each country posses different specific demands on the telephone line and on the communication devices connected thereto when it comes to allowable voltages, currents and input impedances under varies line conditions. Telephone requirements make it in combination with certain of those features impossible to comply with the line requirements imposed by local national telecommunication authorities. This holds in particular for requirements concerning quantities such as minimum allowable input impedance under various line conditions.

So known power convertors have the disadvantage of not being able to hold line input quantities of such telecommunication devices within the prescribed boundaries under severe line/load conditions.

SUMMARY OF THE INVENTION

It is an object of the present invention to provide an IC integratable power convertor, which is able to detract power from a communication line and supply a sufficient amount of power under a wider variety of line conditions, while complying with the telecommunication requirements.

To this end, an embodiment of the power convertor according to the invention has the characterising features outlined in claim 1.

It is an advantage of the power convertor according to the invention that the switching control device receives a control signal from the input current determining means. The input current determining means are capable of adjusting the switching control device by means of an outputted signal which contains an estimation of the principally alternating input current to the power convertor. This means that if the input voltage $V_{in}$ is known, then by said outputted signal the alternating input current $I_{in}$ can be influenced proportional to $V_{in}$ as a consequence of which, under more of the load condition concerned, its quotient, which is the input impedance can for example be kept constant or above a required minimum value generally depending on the available line power in order to be able to comply with the above mentioned requirements. This is in particular important at low input voltages where the prior art devices used to show such a low input impedance that its value became lower than the minimum prescribed input impedance mentioned earlier.

It is an advantage of the power convertor according to the invention that the solution presented does not provide for (extreme) long timeconstants which would otherwise jeopardize the stability of the convertor as a whole.

A further advantage of the power convertor according to the invention is that the proposed solution does not decrease the efficiency of the conversion by the power convertor. Furthermore the proposed solution provides for the possibility of a low voltage IC integration process contrary to some other prior art power convertors. In addition there are when it comes to the power convertor according to the invention no restrictions regarding allowable loads and load conditions to be considered any longer.

A further embodiment of the power convertor according to the invention has the characterising features outlined in claim 2. Determining the input current by more or less explicitly digitally calculating the output power taken from the output and dividing it be the input voltage reveals simple calculating means which can be implemented easily on a limited chip area.

Still a further embodiment of the power convertor according to the invention comprises analog means, in particular translinear means as outlined more specific in claim 5. This has the advantage of providing an analog, though easily to integrate power convertor having a translinear means embodied with only four coupled semiconductors.

An embodiment of the power convertor according to the invention outlined in claim 7 has the advantage that the output of the differential amplifier provides an error signal for controlling the switching control device. Under certain load output conditions the duty cycle of the switching control device is adjusted by means of the error signal to decrease the input current to the power convertor in order to avoid that the input impedance would become very low.

In the embodiment of the power convertor according to the invention as outlined in claim 8 the second control input to the switching control device is used to stabilize the output voltage of the power convertor by adjusting the duty cycle accordingly.

BRIEF DESCRIPTION OF THE DRAWINGS

The present invention will now be described, by way of example, with reference to the accompanying drawings, wherein.

Throughout the figures the same reference numerals are used for the same features.

DESCRIPTION OF THE PREFERRED EMBODIMENTS

Figure 1:
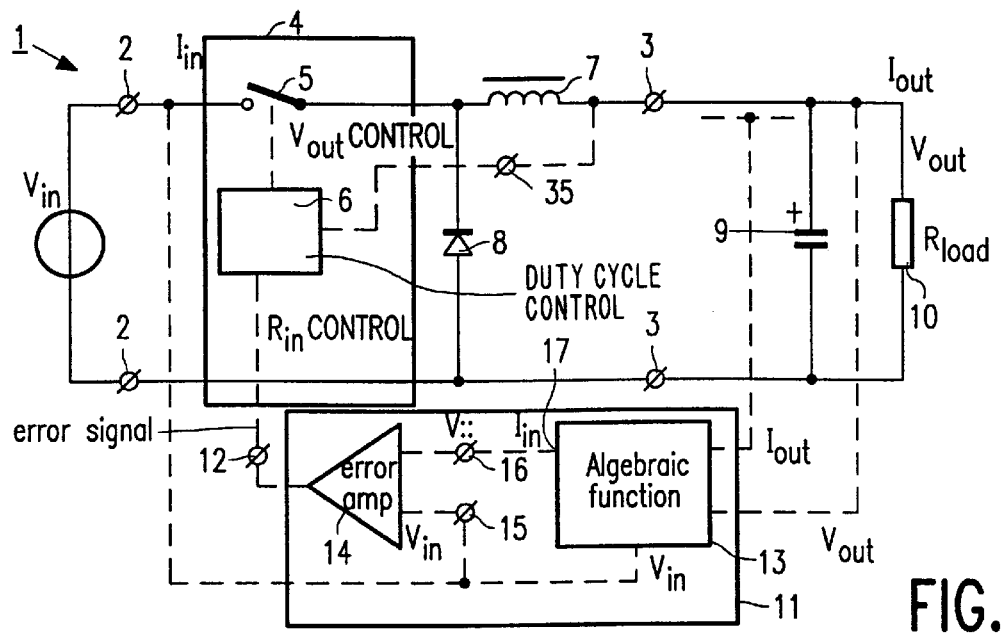
FIG. 1 shows a circuit diagram to exemplify possible embodiments of the power convertor according to the invention.

FIG. 1 shows a circuit diagram of a power convertor 1. The power convertor 1 comprises an input 2, an output 3, and a switching control device 4 having a switch 5 and a duty cycle control 6 for controlling the switch 5. The switch 5 of the switching control device 4 is connected to the input 2 of the power convertor 1. The convertor 1 also comprises an energy storage means 7 here containing an electric coil connected to the switch 5 and output 3 for storage of electrical energy and a flyback diode 8. The output 3 is shown to have a capacitor 9 and a load 10 connected thereto. The convertor 1 also comprises an input current determining means 11 coupled between the output 3 and a control input 12 of the switching control device 4.

The functioning of the power convertor 1 is such that a current $I_{in}$ and a voltage $V_{in}$ applied on input 2 are converted to a generally different output current $I_{out}$ and output voltage $V_{out}$ on the output 3. If switch 5 in switching control device 4 is closed a linear increasing current starts to flow through coil 7 to load capacitor 9 creating an output voltage across the load 10. A corresponding load current will flow through load 10. Opening of the switch 5 leads to a release of the inductive energy built up in coil 7 through flyback diode 8. The input current determining means 11 determine the (average) input current in a way to be described and control the duty cycle of switch 5 such that at least a minimum allowable input impedance $Z_{in}$, which equals $V_{in}/I_{in}$, is maintained.

Figure 2:
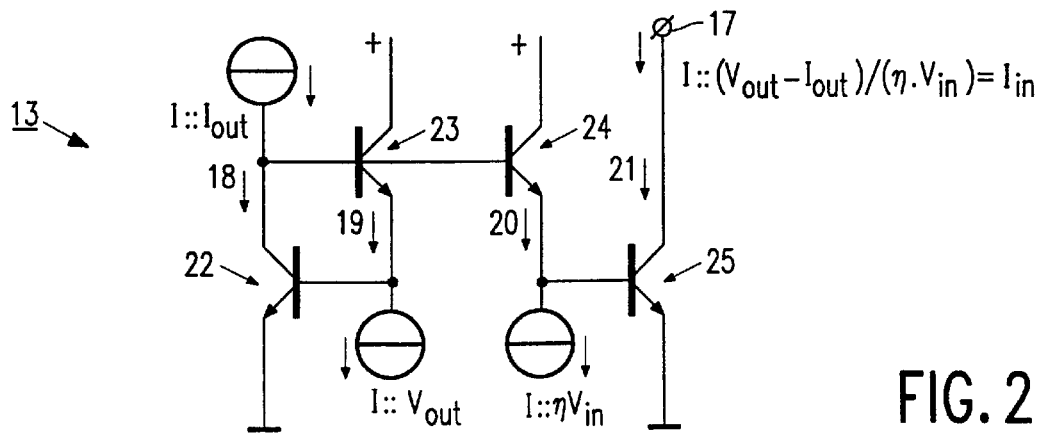
FIG. 2 diagrammatically shows a circuit diagram of a translinear means for application in the power convertor of FIG. 1.

The input current determining means 11 can be implemented either in a digit way by means of a calculating microprocessor, or in an analog way by means of for example a translinear means embodied such as shown in FIG. 2. In either implementation the output power is determined implicitly or explicitly calculated based on the output current $I_{out}$ and the output voltage $V_{out}$ on output 3. Given the efficiency ¶ of the convertor 1, which might be close to 100% and the input voltage $V_{in}$ on input 2, then the input current $I_{in}$ is determined by the relation:

$$I_{in}=(V_{out}*I_{out})/(¶*V_{in})$$

The input current thus determined is represented by a signal which can be used to derive a control signal therefrom on control input 12 of switching control device 4 for influencing the duty cycle such that the input impedance $Z_{in}$ remains within prescribed boundaries.

If implemented in an analog way use can be made of the translinear means 13 also shown in FIG. 2. This translinear means 13 determines based on the above relation, a signal V which is proportional to the determined input current $I_{in}$. The input current determining means 11 also comprises a differential amplifier 14 having inputs 15 and 16. First input 15 is connected to input 2 of the power convertor 1 and second input 16 is connected to an output 17 of the translinear means 13. The signal generated by amplifier 14 on control input 12 forms an error signal for controlling the duty cycle control 6 accordingly.

The translinear means 13 comprises four parallel main stream paths 18, 19, 20, and 21. Three main stream paths 18, 19, and 20 contain current sources providing currents representing $I_{out}$, $V_{out}$, and $¶*V_{in}$ respectively. The consequence is that a current which represents $I_{in}$ corresponding to the above relation will flow through main stream path 21, which fourth main stream path 21 is coupled to the first control input 12 of the switching control device 4 via output 17 of the translinear means 13. Said main stream paths 18–21 are mutually coupled by means of semiconductors 22–25 in a way as shown. The general theory on translinear circuits can be taken from any textbook on Electronics and from the article "Translinear Circuits: An Historical Overview" by Barrie Gilbert, published in Analog Integrated Circuits and Signal Processing, 9, pp 95–118 (1996), included herein by reference.

Figure 3:
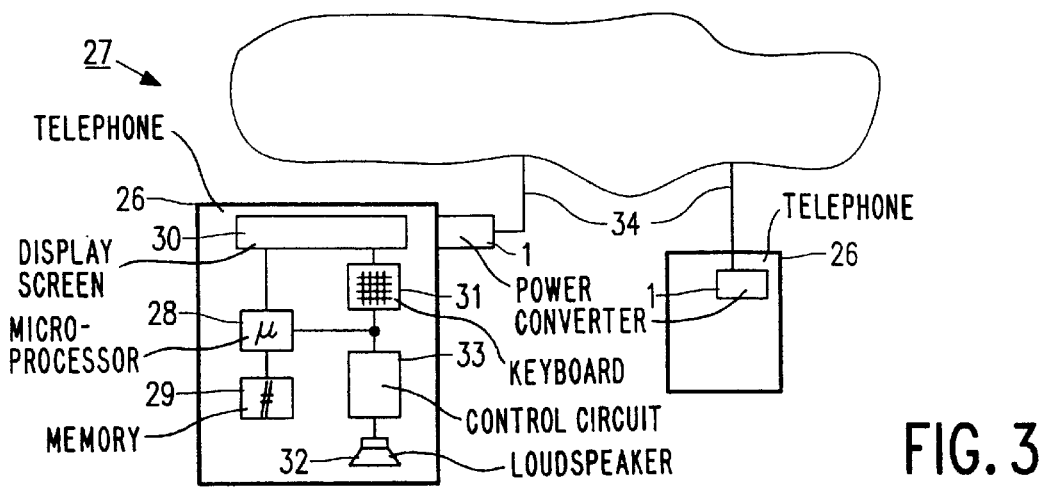
FIG. 3 shows a telecommunication device formed as a telephone provided with the power convertor of FIG. 1.

FIG. 3 shows a power convertor 1 implemented on an IC arranged in a telecommunication device embodied as a telephone 26, such as a public telephone. Such a telephone 26 which can be a fixed telephone in a telecommunication system 27 generally contains a microprocessor 28, an associated memory 29, a display screen 30, a keyboard 31, a loudspeaker 32 and associated control circuit 33. All may where possible be included in one integrated circuit. Of course the telephone 26 will comprise all further features properly implemented and necessary for the required functioning thereof, together with additional features such as hands free capabilities, listening in features, loudspeaker facilities, dialling features, charging facilities etcetera, whose power can now under a wide variety of line load conditions be derived from the line 34 by each telephone 26.

The circuit diagram of FIG. 1 shows that the switching control device 4 is provided with a second control input 35 coupled, generally through a differential amplifier (not shown), to the output 3 of the power convertor 1. A signal on the second control input 3 is being used to stabilize the output voltage on output 3. However in case of insufficient power on input 2 of the power convertor 1 the control signal on the first control input 12 takes precedence over the control signal on the second control input 35 such that the minimum allowable input impedance is then being maintained by lowering the output voltage accordingly.

I claim:

1. A power convertor comprising:
   an input and an output,
   a switching control device coupled to the input, the switching control device being provided with a control input coupled to the output,
   an energy storage means coupled between the switching control device and the output, and
   an input current estimation means coupled between the output and the control input of the switching control device,
   the input current estimation means being arranged for determining an estimation signal of the input current which is proportional to a quotient of an output power of the power convertor and an input voltage of the convertor, and the estimation signal being supplied to the control input.

2. A power convertor according to claim 1, wherein the input current estimation means are provided with digital means.

3. A power convertor according to claim 1, wherein the input current estimation means are provided with analog means.

4. A power convertor according to claim 3, wherein the analog means are translinear means.

5. A power convertor according to claim 4, wherein the translinear means comprises four parallel main stream paths, three main stream paths containing current sources, the translinear means being arranged such that if the first current source provides a current which is proportional to output current $I_{out}$, the second current source provides a current which is proportional to output voltage $V_{out}$, and the third current source provides a current which is proportional to the efficiency ¶ of the power convertor multiplied by the input voltage $V_{in}$, that then a current will flow in the fourth main stream path which equals a current which is proportional to: $(V_{out}*I_{out})/(¶*V_{in})$, which fourth main stream path is coupled to the first control input of the switching control device.

6. A power convertor according to claim 4 or 5, wherein the translinear means comprises semiconductor means.

7. A power convertor according to claim 1, wherein the power convertor comprises a differential amplifier having a first and a second input and an output, the first input being connected to the input of the power convertor, the second input being connected to the input current determining means and the output of the differential amplifier being connected to the control input of the switching control device.

8. A power convertor according to claim 1, wherein the switching control device is provided with a further control input for stabilising the output voltage of the power convertor, the further control input being coupled to the output of the power convertor.

9. A power convertor according to claim 8, wherein the power convertor is embodied such that a first control signal on the further control input takes precedence over a second control signal on the control input of the switching control device.

10. A power convertor according to claim 1, wherein the energy storage means comprises at least one coil.

11. An integrated circuit comprising a power convertor, the power convertor comprising:
   an input and an output,
   a switching control device coupled to the input, the switching control device being provided with a control input coupled to the output,
   an energy storage means coupled between the switching control device and the output, and
   an input current estimation means coupled between the output and the control input of the switching control device,
      the input current estimation means being arranged for determining an estimation signal of the input current which is proportional to a quotient of an output power of the power convertor and an input voltage of the convertor, and the estimation signal being supplied to the control input.

12. A telecommunication device comprising a power convertor, the power convertor comprising:
   an input and an output,
   a switching control device coupled to the input, the switching control device being provided with a control input coupled to the output,
   an energy storage means coupled between the switching control device and the output, and
   an input current estimation means coupled between the output and the control input of the switching control devices
      the input current estimation means being arranged for determining an estimation signal of the input current which is proportional to a quotient of an output power of the power convertor and an input voltage of the convertor, and the estimation signal being supplied to the control input.

* * * * *